(12) United States Patent
Wang et al.

(10) Patent No.: US 11,892,766 B2
(45) Date of Patent: Feb. 6, 2024

(54) PROJECTION SCREEN

(71) Applicant: APPOTRONICS CORPORATION LIMITED, Guangdong (CN)

(72) Inventors: Lin Wang, Guangdong (CN); Xiaofeng Tang, Guangdong (CN); Wei Sun, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 15 days.

(21) Appl. No.: 17/597,434

(22) PCT Filed: Jun. 28, 2020

(86) PCT No.: PCT/CN2020/098466
§ 371 (c)(1),
(2) Date: Jan. 5, 2022

(87) PCT Pub. No.: WO2021/004303
PCT Pub. Date: Jan. 14, 2021

(65) Prior Publication Data
US 2022/0291579 A1 Sep. 15, 2022

(30) Foreign Application Priority Data

Jul. 5, 2019 (CN) .......................... 201910605057.7

(51) Int. Cl.
*G03B 21/60* (2014.01)
*G03B 21/56* (2006.01)
(Continued)

(52) U.S. Cl.
CPC ............. *G03B 21/60* (2013.01); *G03B 21/56* (2013.01); *G03B 21/58* (2013.01); *G03B 21/62* (2013.01); *G03B 21/625* (2013.01)

(58) Field of Classification Search
CPC ........ G03B 21/56; G03B 21/60; G03B 21/58; G03B 21/62; G03B 21/625
(Continued)

(56) References Cited

U.S. PATENT DOCUMENTS

| 7,667,893 B2 * | 2/2010 | Peterson | ................ G02B 13/06 359/455 |
| 2007/0146876 A1 * | 6/2007 | Peterson | .............. G03B 21/602 359/449 |

(Continued)

FOREIGN PATENT DOCUMENTS

| CN | 1928699 A |   | 3/2007 |
| CN | 1928699 A | * | 3/2007 |

(Continued)

OTHER PUBLICATIONS

State Intellectual Property Office of the People's Republic of China, Office Action and Search Report Issued in Application No. 201910605057.7, dated Nov. 10, 2022, 9 pages. (Submitted with Partial Translation).

(Continued)

*Primary Examiner* — Stephanie E Bloss
*Assistant Examiner* — Kevin C Butler
(74) *Attorney, Agent, or Firm* — McCoy Russell LLP

(57) ABSTRACT

Provided is a projection screen, the taper angles of a plurality of triangular pyramid units arranged in an array are designed to gradually change according to a predetermined relationship, so that the image light emitted from the projector is reflected by a microstructure layer with a triangular pyramid unit and then converges to a range centered on the human eye, which reduces the difference in brightness at different viewing positions, so as to ensure that the projection screen has high brightness uniformity and high gain.

12 Claims, 5 Drawing Sheets

(51) Int. Cl.
*G03B 21/58* (2014.01)
*G03B 21/62* (2014.01)
*G03B 21/625* (2014.01)

(58) Field of Classification Search
USPC .......................................................... 359/443
See application file for complete search history.

(56) References Cited

U.S. PATENT DOCUMENTS

| | | | |
|---|---|---|---|
| 2019/0064646 A1 | 2/2019 | Chapman et al. | |
| 2021/0389658 A1* | 12/2021 | Sun ........................ | G02B 5/003 |
| 2022/0291579 A1* | 9/2022 | Wang ...................... | G03B 21/60 |

FOREIGN PATENT DOCUMENTS

| | | | | |
|---|---|---|---|---|
| CN | 203587956 U | | 5/2014 | |
| CN | 203587956 U | * | 5/2014 | |
| CN | 104076589 A | | 10/2014 | |
| CN | 104076589 A | * | 10/2014 | |
| CN | 204009335 U | * | 12/2014 | |
| CN | 204009335 U | | 12/2014 | |
| CN | 106406012 A | | 2/2017 | |
| CN | 207895098 U | | 9/2018 | |
| CN | 108663821 A | | 10/2018 | |
| CN | 109388013 A | | 2/2019 | |
| CN | 109388014 A | | 2/2019 | |
| CN | 109634046 A | | 4/2019 | |
| CN | 112180672 A | * | 1/2021 | ......... G02B 27/0101 |
| CN | 112180673 A | * | 1/2021 | ............. G03B 21/60 |
| EP | 3859446 A1 | * | 8/2021 | ............. G02B 5/003 |
| JP | 2006145881 A | | 6/2006 | |
| JP | 2006145881 A | * | 6/2006 | ............. G03B 21/10 |
| JP | 2018077379 A | | 5/2018 | |
| KR | 20010018578 A | * | 3/2001 | ............... G02B 5/12 |
| KR | 20010018578 A | | 3/2001 | |
| WO | WO-2018027071 A1 | * | 2/2018 | ......... G02B 27/0172 |
| WO | WO-2019024366 A1 | * | 2/2019 | ............. G03B 21/60 |
| WO | WO-2019024367 A1 | * | 2/2019 | ............. G03B 21/60 |
| WO | WO-2019024368 A1 | * | 2/2019 | ............. G02B 5/02 |
| WO | WO-2019179124 A1 | * | 9/2019 | |
| WO | WO-2020063156 A1 | * | 4/2020 | ............. G02B 5/003 |
| WO | WO-2020093805 A1 | * | 5/2020 | ............. G02B 5/003 |
| WO | WO-2021004301 A1 | * | 1/2021 | ......... G02B 27/0101 |
| WO | WO-2021004303 A1 | * | 1/2021 | ............. G03B 21/60 |

OTHER PUBLICATIONS

ISA China National Intellectual Property Administration, International Search Report Issued in Application No. PCT/CN2020/098466, dated Sep. 28, 2020, WIPO, 6 pages.

* cited by examiner

PROJECTION SCREEN

CROSS REFERENCE TO RELATED APPLICATIONS

The present application is a U.S. National Phase of International Application No. PCT/CN2020/098466 entitled "PROJECTION SCREEN," and filed on Jun. 28, 2020. International Application No. PCT/CN2020/098466 claims priority to Chinese Patent Application No. 201910605057.7 filed on Jul. 5, 2019. The entire contents of each of the above-listed applications are hereby incorporated by reference for all purposes.

TECHNICAL FIELD

The present disclosure relates to the technical field of projection, and in particular, to a projection screen.

BACKGROUND AND SUMMARY

Projection display is increasingly used nowadays. The principle of the projection display is as follows: a projector projects image light onto a screen (known as a projection screen), the image light is scattered on the screen, and part of the scattered image light is received by human eyes. It seems to the human eyes as if the image light were emitted from the screen. In this way, an image is formed on the screen. Compared with the case where the projector projects image light directly onto a wall, the projection screen significantly improves the display brightness.

The present disclosure provides a projection screen with good brightness uniformity and high gain.

A projection screen according to an embodiment of the present disclosure includes a microstructure layer including a matrix layer and a microstructure unit formed on a surface of the matrix layer. The microstructure unit includes triangular pyramid units arranged in an array. Each of the triangular pyramid units includes a light output surface attached to and fixed to the surface of the matrix layer. At least two of the triangular pyramid units that are arranged in a same row are identical to each other. At least two triangular pyramid units of the triangular pyramid units that are arranged in a same column vary gradually. Each of the taper angles forms between a base of one of the at least two triangular pyramid units that has the taper angle and an edge, parallel to a column direction, of the triangular pyramid unit. The base is a surface of the triangular pyramid unit other than the light output surface and two surfaces that intersect to form the edge.

The projection screen provided by the present disclosure includes multiple triangular pyramid units arranged in an array. Taper angles of the triangular pyramid units vary gradually according to a predetermined relationship, so that image light transmitted from a projector is reflected by a microstructure layer having the triangular pyramid units and then converged in a range centered around human eyes, to reduce brightness differences at different viewing positions, thereby ensuring high brightness uniformity and high gain of the projection screen.

DETAILED DESCRIPTION

The objective of the present disclosure is as follows: for a projection screen including multiple triangular pyramid units arranged in an array, taper angles of the triangular pyramid units vary gradually, so that image light transmitted from a projector is reflected by a microstructure layer having the triangular pyramid units and then converged in a range centered around human eyes, to reduce brightness differences at different viewing positions, thereby ensuring high brightness uniformity and high gain of the projection screen. In this way, both good brightness uniformity and high gain are achieved.

Based on the objective above, the following clearly and completely describes the technical solutions in the embodiments of the present disclosure with reference to the accompanying drawings in the embodiments of the present disclosure. It is understandable that the specific embodiments described herein are merely intended to explain the present disclosure, rather than to limit the present disclosure. The following embodiments and technical features in the embodiments can be combined with each other when there is no conflict therebetween. It should also be understood that, for convenience of description, only a partial structure related to the present disclosure rather than all the structure is shown in the accompany drawings. All other embodiments obtained by the person of ordinary skill in the art based on the embodiments of the present disclosure without creative efforts should fall within the protection scope of the present disclosure.

Figure 1:
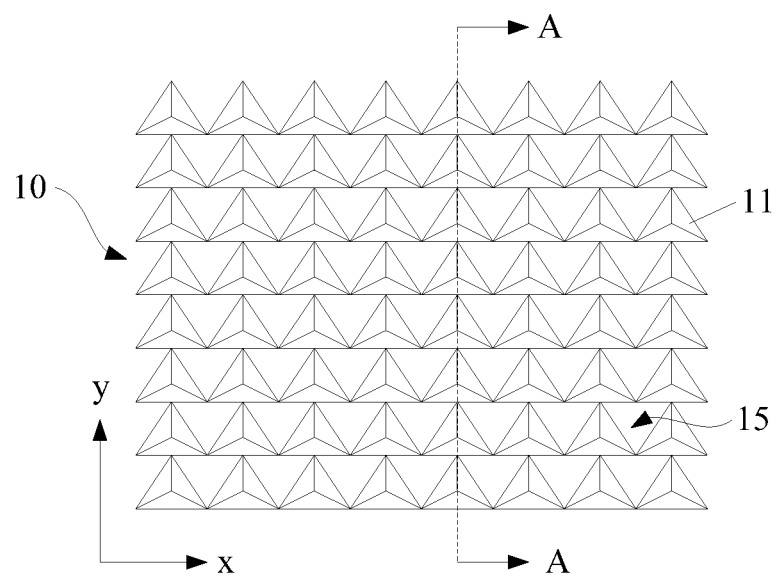
FIG. 1 is a top view of a partial structure of a microstructure layer of a projection screen according to a first embodiment of the present disclosure.
Figure 2:
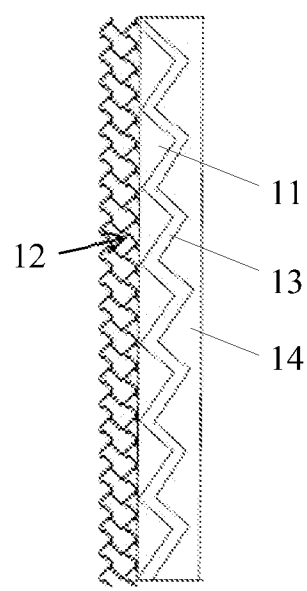
FIG. 2 is a cross-sectional view of the projection screen in FIG. 1 taken along direction A-A.

FIG. 1 is a top view of a partial structure of a microstructure layer of a projection screen according to a first embodiment of the present disclosure. FIG. 2 is a cross-sectional view of the projection screen in FIG. 1 taken along direction A-A. Referring to FIG. 1 and FIG. 2, the microstructure layer of the projection screen 10 includes a matrix layer 12 and a microstructure unit formed on a surface of the matrix layer 12, and the microstructure unit includes multiple triangular pyramid units 11 arranged in an array.

Figure 3:
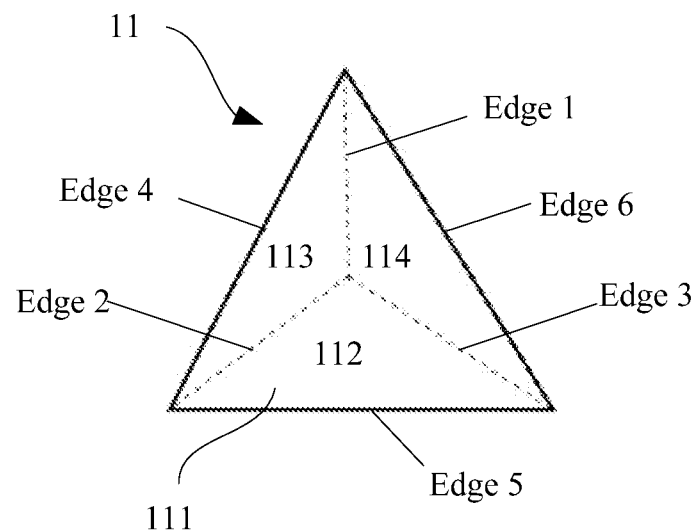
FIG. 3 is a perspective view of a triangular pyramid unit shown in FIG. 1.

FIG. 3 is a perspective view of a triangular pyramid unit 11 shown in FIG. 1. Referring to FIG. 1 to FIG. 3, a single triangular pyramid unit 11 includes six straight edges: edge 1, edge 2, edge 3, edge 4, edge 5, and edge 6. The edge 4, the edge 5, and the edge 6 are connected end to end sequentially to form a triangular first surface 111; the edge 2, the edge 3, and the edge 5 are connected end to end sequentially to form a triangular second surface 112; the edge 1, the edge 2, and the edge 4 are connected end to end sequentially to form a triangular third surface 113; and the edge 1, the edge 3, and the edge 6 are connected end to end sequentially to form a triangular fourth surface 114.

Figure 4:
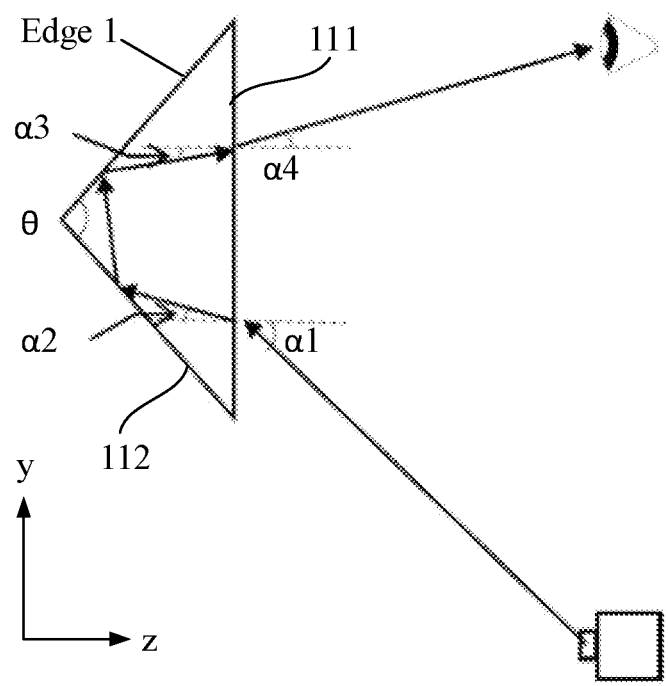
FIG. 4 is a side view of the triangular pyramid unit in FIG. 3 in a vertical viewing direction.
Figure 5:
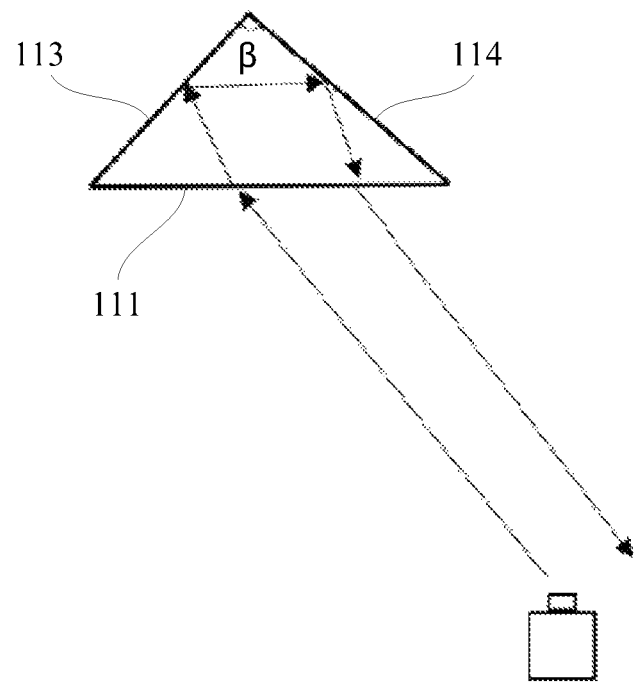
FIG. 5 is a side view of the triangular pyramid unit in FIG. 3 in a horizontal viewing direction.

FIG. 4 is a side view of the triangular pyramid unit 11 in FIG. 3 in a vertical viewing direction. Referring to FIG. 3 and FIG. 4, an angle between the edge 1 and the first surface 111 is a vertex angle of the triangular pyramid unit 11, and an angle θ between the edge 1 and the second surface 112 is a taper angle of the triangular pyramid unit 11. FIG. 5 is a side view of the triangular pyramid unit 11 in FIG. 3 in a horizontal viewing direction. Referring to FIG. 3 and FIG. 5, an angle β between the third surface 113 and the fourth surface 114 is a span angle of the triangular pyramid unit 11.

Referring to FIG. 1 to FIG. 5, the first surfaces 111 of all triangular pyramid units 11 are located in a same plane, for example, being located on a matrix layer 12 with a uniform thickness. The taper angles θ of all triangular pyramid units 11 face towards a same side. All triangular pyramid units 11 arranged along a first direction D1 (e.g., a horizontal direction x shown in FIG. 1) are identical, which indicates that structures and arrangement patterns thereof are identical to each other. That is, the taper angles θ of the triangular pyramid units 11 arranged along the first direction D1 are also the same. The taper angles θ of the triangular pyramid units 11 arranged along a second direction D2 (e.g., a vertical direction y shown in FIG. 1) are different.

In the present disclosure, referring to FIG. 3, FIG. 4, and FIG. 5, after image light transmitted from a projector is incident on the projection screen 10, the image light is refracted by the first surface 111 and then irradiated to the second surface 112. A part of light reflected by the second surface 112 (a light component in the horizontal direction as shown in FIG. 5) is irradiated to the fourth surface 114, reflected by the fourth surface 114, and transmitted by the first surface 111 to human eyes. Another part of light reflected by the third surface 113 (a light component in the vertical direction as shown in FIG. 4) is irradiated to the first surface 111 and transmitted by the first surface 111 to the human eyes. Similarly, a part of light reflected by the fourth surface 114 (e.g., a light component in the horizontal direction) is irradiated to the third surface 113, reflected by the third surface 113, and transmitted by the first surface 111 to the human eyes; another part of light reflected by the fourth surface 114 (e.g., a light component in the vertical direction) is irradiated to the first surface 111 and transmitted by the first surface 111 to the human eyes. The first surface 111 not only serves as a light incident surface of the projection screen 101, but also serves as a light output surface of the projection screen 10. The image light is finally transmitted by the first surface 111 to the human eyes.

Based on this principle, in the projection screen 10, provided that the taper angles θ of the multiple triangular pyramid units 11 arranged along the second direction D2 satisfy a preset relationship, the image light transmitted from the projector can be reflected by the triangular pyramid units 11 and then converged in a range centered around the human eyes, to reduce brightness differences at different viewing positions, thereby ensuring high brightness uniformity and high gain of the projection screen. Specifically, In the horizontal direction, when the projector is located at the lower half part of the projection screen 10, assuming that the human eyes are at the middle position of the projection screen 10, the taper angles θ gradually increase from bottom to top (with FIG. 4 and FIG. 6 as an example), so as to transmit as much image light to the position of the human eyes as possible.

In the horizontal direction, when the projector is located at the upper half part of the projection screen 10, still assuming that the human eyes are at the middle position of the projection screen 10, the taper angles θ gradually increase from top to bottom (with FIG. 4 as an example), so as to transmit as much image light to the position of the human eyes as possible.

According to an image light transmission path indicated by the arrow in FIG. 4 (it should be understood that the image light transmission path shown in FIG. 4 is not an actual image light transmission path; sizes of incident angles and reflection angles of the image light at various interfaces are not in the relationship shown in FIG. 4; and FIG. 4 merely illustrates an angle variation trend of the taper angles θ in the case of different incident angles and reflection angles), the triangular pyramid unit 11 satisfies the following relational expressions:

$$\frac{180 + (\alpha 2 + \alpha 3)}{2} = \theta \frac{180 + (\alpha 2 + \alpha 3)}{2} = \theta,\qquad \text{relational expressions 1-1}$$

$$\sin\alpha 1 = n \times \sin\alpha 2, \text{ and} \qquad \text{relational expressions 1-2}$$

$$\sin\alpha 4 = n \times \sin\alpha 3,\qquad \text{relational expressions 1-3}$$

where θ denotes the taper angle of the triangular pyramid unit 11, α1 denotes an incident angle of the image light when it is transmitted to the first surface 111 during incidence, α2 denotes a refraction angle of the image light after it is refracted by the first surface 111 during incidence, α3 denotes an incident angle of the image light when it is transmitted to the first surface 111 during emergence, α4 denotes an emergent angle of the image light, and n denotes a refractive index of the triangular pyramid unit 11.

The following relational expression 1 can be derived from the above three relational expressions:

$$\theta = \frac{180 + \arcsin\left(\frac{\sin\alpha 1}{n}\right) + \arcsin\left(\frac{\sin\alpha 4}{n}\right)}{2}. \qquad \text{relational expression 1}$$

Figure 6:
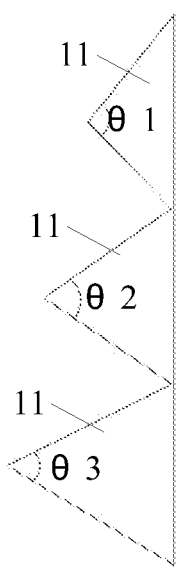
FIG. 6 is a schematic diagram of a partial structure of the projection screen shown in FIG. 2.

In other words, provided that the taper angles θ of the triangular pyramid units 11 arranged along the second direction D2 satisfy relational expression 1, in the vertical direction y, the incident angles α1 and the emergent angles α4 change continuously between adjacent triangular pyramid microstructures, and working angles (i.e., taper angles) θ of adjacent triangular pyramid microstructures on the projection screen 10 also change continuously. That is, as shown in FIG. 6, the taper angles θ1, θ2 and θ3 of three adjacent triangular pyramid units 11 in the vertical direction change continuously according to relational expression 1.

When the projector is located at the lower half part of the projection screen 10, assuming that the human eyes are at the middle position of the projection screen 10 and light beams emitted by the projector are cone-shaped, the triangular pyramid unit 11 at the lowermost of the projection screen 10 has a minimum incident angle α1 and a maximum emergent angle α4, and the triangular pyramid units 11 located at higher positions of the projection screen 10 have gradually increasing incident angles α1 and gradually decreasing emergent angles α4. The incident angle α1 and the emergent angle α4 vary within a range of 0°-90°, that is, $$\arcsin\left(\frac{\sin\alpha 1}{n}\right)$$

gradually increases and $$\arcsin\left(\frac{\sin\alpha 4}{n}\right)$$

gradually decreases, and therefore arcsin $$\left(\frac{\sin\alpha 1}{n}\right) - \arcsin\left(\frac{\sin\alpha 4}{n}\right)$$

gradually increases.

As can be seen, the taper angles θ increase gradually from bottom to top of the projection screen 10.

When the projector is located at the upper half part of the projection screen 10, assuming that the human eyes are at the middle position of the projection screen 10 and light beams emitted by the projector are cone-shaped, the triangular pyramid unit 11 at the uppermost of the projection screen 10 has a minimum incident angle α1 and a maximum emergent angle α4, and the triangular pyramid units 11 located at lower positions of the projection screen 10 have gradually increasing incident angles α1 and gradually decreasing emergent angles α4. The incident angle α1 and the emergent angle α4 vary within a range of 0-90°, that is, $$\arcsin\left(\frac{\sin\alpha 1}{n}\right)$$

gradually decreases and $$\arcsin\left(\frac{\sin\alpha 4}{n}\right)$$

gradually increases, and therefore arcsin $$\left(\frac{\sin\alpha 1}{n}\right) - \arcsin\left(\frac{\sin\alpha 4}{n}\right)$$

gradually decreases.

As can be seen, the taper angles θ decrease gradually from bottom to top of the projection screen 10.

Figure 7:
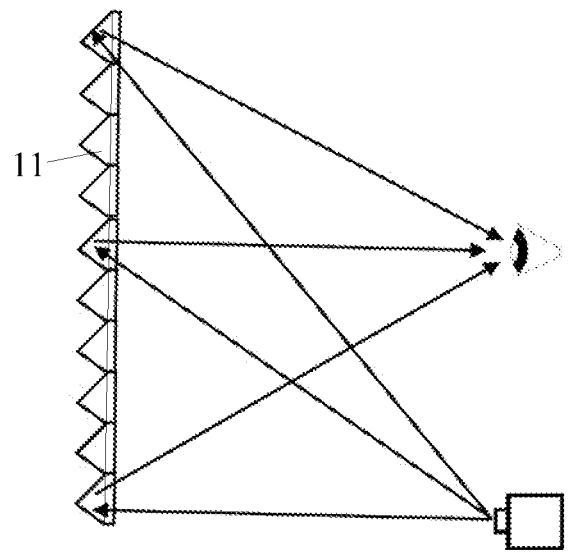
FIG. 7 is a schematic diagram of vertical transmission of image light projected to the projection screen shown in FIG. 1.

It can be learned from the above that, in the vertical direction y of the projection screen 10, by setting different working angles θ at different height positions, all image light transmitted from the projector to different positions of the projection screen 10 can be converged within the range where the human eyes are located, as shown in FIG. 7.

In an actual scenario, both the third surface 113 and the fourth surface 114 of the triangular pyramid unit 11 are treated with physical vapor deposition (PVD) to achieve a surface reflectivity of 88%. With this implementation scenario as an example, as a viewer moves away from the central position of the projection screen 10 in the horizontal direction, i.e., as a horizontal viewing angle changes, the brightness uniformity of the projection screen 10 is maintained at 80% or above, while the brightness uniformity of the projection screen 20 in related art is maintained at 30% or lower. As can be seen, the brightness uniformity of the projection screen 10 is much higher than the brightness uniformity of the projection screen 20 in related art. In this case, the gain of the projection screen 10 is 4.9, which is much higher than the gain of 1, thus achieving high gain.

To improve the light reflection efficiency, the second surface 112, the third surface 113, and the fourth surface 114 of the triangular pyramid unit 11 can be coated with a reflective material. The reflective coating can be a mixture of a metal reflective material, such as aluminum and silver, and other additives. The additives include a certain proportion of mixture of a leveling agent, a wetting agent, a defoaming agent and the like that are used to improve a coating effect, or a certain proportion of mixture of anhydrous acetone, anhydrous xylene, anhydrous cyclohexanone, anhydrous butanone, ethyl acetate and anhydrous butyl acetate, and the like. Depending on the actual application scenario, an appropriate diffusion material can also be added to the reflective coating to enhance the diffusion effect. The diffusion material includes, but not limited to, epoxy, acrylic or silicone organic resin particles, or other inorganic scattering materials.

Figure 8:
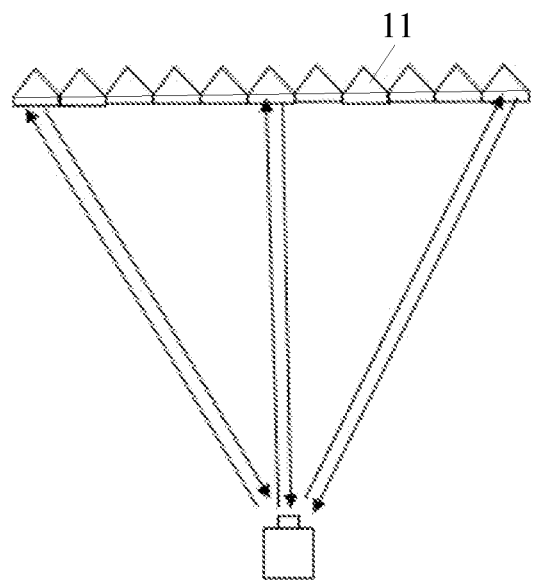
FIG. 8 is a schematic diagram of horizontal transmission of image light projected to the projection screen shown in FIG. 1.

Further referring to FIG. 5, in the horizontal direction x, the span angle β is an angle between the third surface 113 and the fourth surface 114, and the value of β is in a range of 90°±20°. When β=90°, after the image light transmitted from the projector is incident on the projection screen 10, the image light is reflected by the third surface 113 and the fourth surface 114, to be transmitted to the first surface 111, and then refracted back to the projector in a direction the same as the incident direction. As shown in FIG. 8, at different positions in the horizontal direction, the image light transmitted from the projector to different positions of the projection screen 10 all return back to the projector along the original paths. When β≠90°, the image light transmitted from the projector to different positions of the projection screen 10 cannot return to the projector along the original paths, but becomes a focal line in the horizontal direction of the observing plane. It is assumed that δ=90°−β, where a greater absolute value of δ corresponds to a longer focal line.

Referring to FIG. 2 again, the projection screen 10 can include a diffusion layer 12, a reflective layer 13, and a protective layer 14, and can include any combination thereof. The array of the triangular pyramid units 11 forms an optical structure layer of the projection screen 10. The optical structure layer can be prepared by heat embossing or UV glue transfer on a transparent substrate 12. The transparent substrate 12 includes, but not limited to, organic materials such as polyethylene terephthalate (PET), polycarbonate (PC), polyvinyl chloride (PVC), polymethyl methacrylate (PMMA), etc. The substrate 12 can be formed by a diffusion layer 12 with a uniform thickness. The thickness of the diffusion layer 12 can be 100 μm to 1000 μm, and the diffusion layer 12 can be made of epoxy, acrylic or silicone organic resin particles, or other inorganic scattering materials. Herein, the optical structure layer is attached and fixed to the diffusion layer 12, and the first surfaces 111 of the triangular pyramid units 11 are attached to and fixed to the diffusion layer 12. The reflective layer 13 covers the optical structure layer. The reflective layer 13 can be doped with scattering particles for scattering light, to enhance the light scattering effect. The protective layer 14 covers the outermost side of the projection screen 10. The protective layer 14 can be prepared by using a water and oxygen barrier material, to project the internal structure.

The diffusion layer 12, the optical structure layer, the reflective layer 13, and the protective layer 14 can be attached and fixed together through a glue, to jointly form the projection screen 10 with high gain and high brightness uniformity.

Referring to FIG. 1 again, a region between two adjacent triangular pyramid units 11 arranged along the horizontal direction x is a light transmission region 15. In other words, half region of the optical structure layer in this embodiment is provided with triangular pyramid microstructures, and the other half region is vacant. In this way, the projection screen 10 of this embodiment is applicable to scenarios where both a foreground image and background content need to be displayed.

Different from the foregoing embodiment, a black coating layer can be provided in a vacant region of the microstructure unit, that is, in a region between two adjacent triangular pyramid units 11 in the same row. The black coating layer is configured to absorb light irradiated thereon. Therefore, light from the back of the projection screen 10 (which can be regarded as ambient light) can be absorbed by the black coating layer, so that the projection screen 10 has high resistance against ambient light, and is applicable to scenarios where it is unnecessary to see the background.

The projection screen 10 can also be provided with other opaque structures in the region between two adjacent triangular pyramid units 11 in a same row. Light from the back of the projection screen 10 can be shielded by the opaque structure, so that the projection screen 10 of this embodiment has high resistance against ambient light, and is applicable to scenarios where it is unnecessary to see the background.

Figure 9:
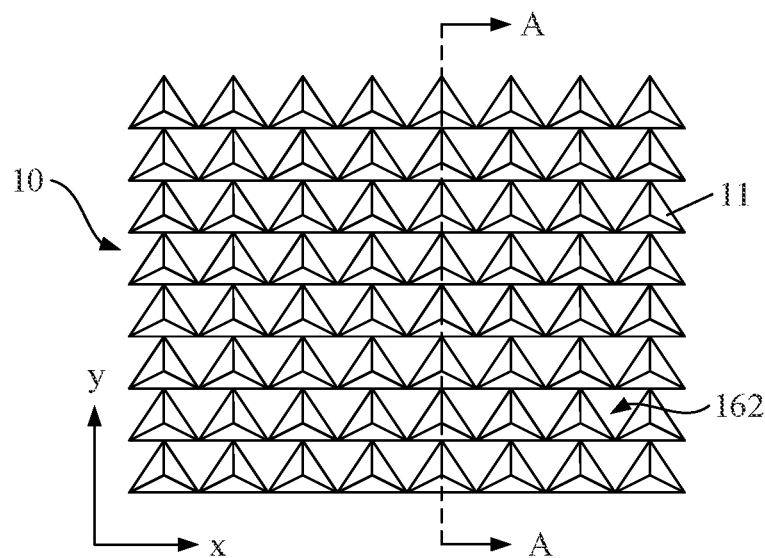
FIG. 9 is another top view of a partial structure of a microstructure layer of a projection screen according to a first embodiment of the present disclosure.

FIG. 9 is another top view of a partial structure of a microstructure layer of a projection screen according to a first embodiment of the present disclosure. As shown in FIG. 9, different from the foregoing embodiment, an optical coating layer 162 can be provided in a region between two adjacent triangular pyramid units 11 in a same row. The optical coating layer can comprise a metal reflective material, a black absorption material, other additives, and a diffusion material, and proportions of the materials of the reflective coating can be adjusted according to actual requirements, to adjust the light transmittance and light reflectivity of the optical coating layer 162. The optical coating layer 162 not only has a light absorbing capability, but also has light reflection and light diffusion capabilities. Therefore, the projection screen 10 not only has high resistance against ambient light to be applicable to scenarios where it is unnecessary to see the background, but also has the light reflection and light diffusion capabilities to improve the intensity of light transmitted to human eyes, thus achieving high gain.

Figure 10:
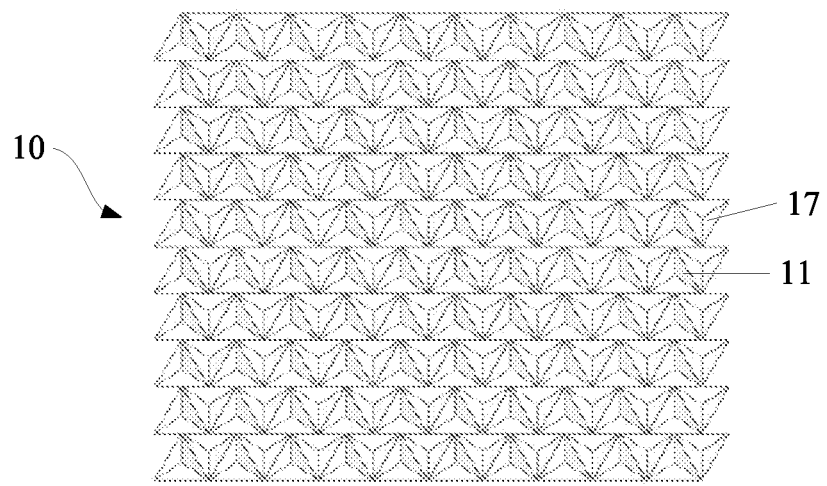
FIG. 10 is a top view of a partial structure of a projection screen according to a second embodiment of the present disclosure.

FIG. 10 is a top view of a partial structure of a projection screen according to a second embodiment of the present disclosure. As shown in FIG. 10, different from the foregoing embodiment shown in FIG. 1, an anti-structure prism 17 is provided between two adjacent triangular pyramid units 11 that are arranged in a same row; in a direction of view perpendicular to the projection screen 10, although any one of the triangular pyramid units 11 is centrally symmetrical to a neighboring anti-structure prism 17, the first surface 111 of the triangular pyramid unit 11 and the first surface of the anti-structure prism 17 face towards a same direction. In this way, the vertex angles of the triangular pyramid units 11 and the vertex angles of the anti-structure prisms 17 face towards opposite directions. For example, as shown in FIG. MUM, the vertex angles of the triangular pyramid units 11 face upwards, while the vertex angles of the anti-structure prisms 17 face downwards.

That is, the first surfaces 111 of the triangular pyramid units 11 and the first surfaces of the anti-structure prisms 17 all face towards the projector. In other words, in the same row, the triangular pyramid units 11 and the anti-structure prisms 17 are sequentially arranged in a staggered manner and are centrally symmetrical to each other.

It should be understood that, the first surfaces 111 of all the triangular pyramid units 11 are located in a same plane, for example, being located on a right side surface of the matrix layer 12 as shown in FIG. 2; and the first surfaces of all anti-structure prisms 17 are also located in a same plane, for example, being located on the right side surface of the matrix layer 12 as shown in FIG. 2. Based on the foregoing configuration of the triangular pyramid units 11 and the anti-structure prisms 17, the taper angles θ of all anti-structure prisms 17 satisfy the following relationship.

In the horizontal direction, when the projector is located at the lower half part of the projection screen 10, assuming that the human eyes are at the middle position of the projection screen 10, the taper angles θ of the triangular pyramid units 11 gradually increase from bottom to top (with FIG. 4 as an example), so as to transmit as much image light to the position of the human eyes as possible. As can be seen, when the projector is located below the projection screen 10, the image light is converged in a range centered around the human eyes after being reflected by the triangular pyramid units 11, to reduce brightness differences at different viewing positions, thereby ensuring good uniformity and high gain of the projection screen 10.

In the horizontal direction, when the projector is located at the upper half part of the projection screen 10, still assuming that the human eyes are at the middle position of the projection screen 10, the taper angles of the anti-structure prisms 17 increase gradually from top to bottom, and the taper angles of the anti-structure prisms 17 from top to bottom also satisfy the foregoing relational expression 1, so as to transmit as much image light to the position of the human eyes as possible. As can be seen, when the projector is located above the projection screen 10, the image light is converged in a range centered around the human eyes after being reflected by the anti-structure prisms 17, to reduce brightness differences at different viewing positions, thereby also ensuring good uniformity and high gain of the projection screen 10.

In the horizontal direction, when the projector is located at the lower half part of the projection screen 10, assuming that the human eyes are at the middle position of the projection screen 10, the taper angles θ of the triangular pyramid units 11 gradually increase from bottom to top (with FIG. 4 as an example), so as to transmit as much image light to the position of the human eyes as possible. As can be seen, when the projector is located below the projection screen 10, the image light is converged in a range centered around the human eyes after being reflected by the triangular pyramid units 11, to reduce brightness differences at different viewing positions, thereby ensuring good uniformity and high gain of the projection screen 10.

In conclusion, whether the projector is located above or below the projection screen 10, the projection screen 10 can have high brightness uniformity and high gain.

In another embodiment, an anti-structure prism 17 is provided between two adjacent triangular pyramid units 11 arranged in a same row. The structure of the anti-structure prism 17 is the same as the structure of the triangular pyramid unit 11. In a direction of view perpendicular to the projection screen 10, any one of the triangular pyramid units 11 is centrally symmetrical to a neighboring anti-structure prism 17, but the first surface 111 of the triangular pyramid unit 11 and the first surface of the neighboring anti-structure prism 17 face towards the opposite directions. That is, the first surface 111 of the triangular pyramid unit 11 faces towards the projector, while the first surface of the anti-structure prism 17 is back to the projector. In this way, both surfaces of the projection screen 10 can achieve high brightness uniformity and high gain.

It should be understood that, described above are merely embodiments of the present disclosure, which do not limit the scope of the patent of the present disclosure. Any equivalent structure or equivalent process change made based on the description and drawings of the present disclosure, such as combination of technical features between different embodiments, or direct or indirect application thereof in other related technical fields, should still fall in the protection scope of the patent of the present disclosure.

It should be understood that, the terms such as "first" and "second" in the present disclosure are used only for the purpose of description and cannot be understood as indicating or implying relative importance or implicitly indicating the number of technical features denoted. Therefore, features defined by "first" and "second" may explicitly or implicitly include at least one of the features. The term "multiple" indicates at least two, for example, two or three, unless otherwise clearly and specifically limited. All the directional indications (such as upper, lower, left, right, front, back, etc.) in the embodiments of the present disclosure are merely used to explain a relative position relationship, motion situations, and the like of the components in a specific gesture (as shown in the figures). If the specific gesture changes, the directivity indication also changes accordingly.

The invention claimed is:

1. A projection screen, comprising:
a microstructure layer comprising a matrix layer and a microstructure unit formed on a surface of the matrix layer,
wherein the microstructure unit comprises triangular pyramid units arranged in an array, wherein each of the triangular pyramid units comprises a light output surface attached to and fixed to the surface of the matrix layer; wherein at least two of the triangular pyramid units that are arranged in a same row are identical to each other; wherein at least two triangular pyramid units of the triangular pyramid units that are arranged in a same column vary gradually; and wherein each of the taper angles forms between a base of one of the at least two triangular pyramid units that has the taper angle and an edge, parallel to a column direction, of the triangular pyramid unit, wherein the base is a surface of the triangular pyramid unit other than the light output surface and two surfaces that intersect to form the edge; and
wherein each of the taper angles of the at least two triangular pyramid units arranged along the column direction satisfy $$\theta = \frac{180 + \arcsin\left(\frac{\sin\alpha 1}{n}\right) + \arcsin\left(\frac{\sin\alpha 4}{n}\right)}{2},$$

where θ denotes the taper angle of one of the at least two triangular pyramid units, α1 denotes an incident angle of image light, α4 denotes an emergent angle of the image light, and n denotes a refractive index of the triangular pyramid unit.

2. The projection screen according to claim 1, wherein a region between two adjacent triangular pyramid units, arranged along a row direction, of the triangular pyramid units is a light transmission region.

3. The projection screen according to claim 1, wherein an opaque structure is disposed between two adjacent triangular pyramid units, arranged along a row direction, of the triangular pyramid units.

4. The projection screen according to claim 1, wherein an optical coating layer is disposed between two adjacent triangular pyramid units of the triangular pyramid units in a row, and the optical coating layer comprises at least two of a reflective material, a light-absorbing material, or a light diffusion material.

5. The projection screen according to claim 1, wherein one of anti-structure prisms is disposed between two adjacent triangular pyramid units of the triangular pyramid units that are arranged along a row direction; wherein the anti-structure prisms have a same structure as the triangular pyramid units, and each of the triangular pyramid units is centrally symmetrical with one of the anti-structure prisms that is adjacent to the triangular pyramid unit; and wherein the light output surface of one triangular pyramid unit of the triangular pyramid units and a light output surface of one of the anti-structure prisms that is adjacent to the one triangular pyramid unit face towards a same direction.

6. The projection screen according to claim 1, wherein an angle between two surfaces that intersect each other to form the edge is within a value range of 90°±20°.

7. The projection screen according to claim 1, further comprising at least two of a diffusion layer, a reflective layer, or a protective layer; wherein the microstructure unit is disposed on the diffusion layer, and the light output surface of each of the triangular pyramid units is attached to and fixed to the diffusion layer; and wherein the reflective layer covers the microstructure unit, and the protective layer covers an outermost side of the projection screen.

8. The projection screen according to claim 7, wherein the reflective layer is doped with scattering particles for scattering light.

9. The projection screen according to claim 7, wherein the diffusion layer is a layer structure with a uniform thickness, and the diffusion layer is the matrix layer of the projection screen.

10. The projection screen according to claim 9, wherein the thickness of the diffusion layer ranges from 100 μm to 1000 μm.

11. The projection screen according to claim 1, wherein the taper angles gradually increase from bottom to top.

12. The projection screen according to claim 1, wherein the taper angles gradually increase from top to bottom.

* * * * *